United States Patent Office 3,630,915
Patented Dec. 28, 1971

3,630,915
THERMALLY STABLE HEAT TRANSFER FLUIDS AND FLUID SYSTEMS
James D. Sullivan, Webster Groves, Mo., assignor to Monsanto Company, St. Louis, Mo.
No Drawing. Filed Oct. 27, 1969, Ser. No. 869,918
Int. Cl. C09k 3/02
U.S. Cl. 252—78                                           9 Claims

ABSTRACT OF THE DISCLOSURE

The long term thermal stability of halogenated polyphenyl heat transfer fluids is improved by adding a phosphorus compound to the fluid and providing an inert gas purge to sweep gaseous decomposition products from the heat transfer system. Fluids maintained in this manner are less corrosive, form less solid decomposition products, and undergo a smaller viscosity increase than untreated fluids when exposed to high temperature applications for extended periods.

BACKGROUND OF THE INVENTION

Field of the invention

This invention relates to heat transfer fluids and fluid systems wherein the thermal decomposition of halogenated polyphenyl fluids is retarded by adding certain phosphorous compounds to the fluid and providing an inert gas purge to remove gaseous decomposition products from the system.

BACKGROUND OF THE INVENTION

Halogenated polyphenyl compounds are well known as heat transfer fluids in the chemical industry and commonly used where the fire resistance of the fluid is an important consideration. One class of fluids widely used in heat transfer systems are the chlorinated biphenyls. These fluids are fire resistant, have low vapor pressures as required for non-pressurized systems, and are inert and oxidation resistant at temperatures up to about 600° F.

When the chlorinated biphenyl heat transfer fluids are exposed to temperatures above 600° F., some polymerization occurs to form high boilers which are quite similar to the original material except for a higher viscosity and boiling point. This polymerization represents thermal decomposition of the original fluid, and when a concentration of approximately 5 to 10% of the high boilers have been formed, the fluid shows a sharp increase in viscosity.

Accompanying the formation of high boilers, small amounts of hydrogen chloride gas are evolved in the fluid. This gas then combines with the moisture present in the system to form acid and increase the corrosivity of the fluid. While many additives have been proposed as HCl scavengers to prevent the heat transfer fluid from becoming corrosive, the user of the fluid is still faced with the problem of fluid decomposition and the resulting increase in viscosity which has an adverse effect upon pump requirements and fluid handling characteristics.

Heat transfer systems intended to be operated at temperatures in excess of 600° F. must now be designed with a side stream distillation facility to constantly remove the higher boiling materials while the system is in operation. Fresh make-up fluid is periodically added to replace the quantity of the high boiler material removed. For smaller systems which are operated on an intermittent basis, it is common practice to completely drain the system and replace the fluid when the viscosity increases to a predetermined level. The used, high viscosity fluid is then reclaimed by distillation.

The removal of high viscosity materials from these heat transfer systems represents an inconvenience and an added expense in the operation of the system. A clear need is evident in the industry for a method to prevent both viscosity increase and the formation of corrosive acids which normally result from thermal decomposition of chlorinated biphenyl heat transfer fluids.

SUMMARY

In the method of the present invention, thermal decomposition of halogenated polyphenyl heat transfer fluids such as chlorinated biphenyl is retarded by incorporating an organic phosphite such as diisopropyl phosphite in the fluid as a stabilizing additive, and by providing the heat transfer system with an inert gas purge such as nitrogen to remove gaseous decomposition products. The thermal decomposition of the fluid, as measured by the rate of the viscosity increase, is drastically reduced to such an extent that the heat transfer system may be operated for extended periods at temperatures of 650° F. or higher with no appreciable viscosity change. Furthermore, the heat transfer fluids maintained in a system operated in accordance with the present invention remain noncorrosive in both liquid and vapor phase, and have no significant amounts of solids accumulation over extended periods of operation.

It is, accordingly, an object of the present invention to provide a total heat transfer system which overcomes the disadvantages of prior art systems by preventing or retarding the thermal decomposition of the heat transfer fluids and the resulting increase in fluid viscosity, corrosivity, and solids or sludge accumulation.

DESCRIPTION OF PREFERRED EMBODIMENTS

The essential components of the present invention are a heat transfer fluid, an organic phosphite stabilizer, and an inert gas purge. The hardware components of the system may be any of a multitude of present commercial designs, with the proviso that the hardware be adapted to accommodate the required inert gas purge.

The heat transfer fluids useful in the present invention include the polyhalogenated polyphenyls, and particularly the chlorinated biphenyls, terphenyls and quaterphenyls. These compounds may contain from 30 to 60% chlorine, and are commercially available. These fluids are well known and widely used in heat transfer applications, although an upper temperature limitation of about 600° F., is generally recommended to prevent thermal decomposition.

The organic phosphite additives useful in this invention are represented by the following structure

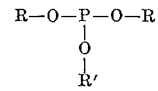

wherein each R and R' is individually selected from the group consisting of straight chain and branched alkyls having from 1 to about 10 carbon atoms including substituted alkyls and aryls having from about 6 to 16 carbon atoms including alkyl, aryl, alkoxy, and aryloxy substituted aryls, and R' can in addition be hydrogen. Specific examples of such organic phosphites are dimethyl phosphite, diethyl phosphite, diisopropyl phosphite, di-n-butyl phosphite, di-sec.-butyl phosphite, di-tert.-butyl phosphite, dipentyl phosphite, di-hexyl phosphite, di-n-propyl phosphite, dioctyl phosphite, trimethyl phosphite, triethyl phosphite, tributyl phosphite, triphenyl phosphite, diphenyl phosphite, ditolyl phosphite, dixylyl phosphite, 2-ethyldiphenyl phosphite, 2,2'-diethyldiphenyl phosphite, 3-chlorodiphenyl phosphite, 3-phenoxydiphenyl phosphite, 4,4'-di-n-butyldiphenyl phosphite, phenyl di-n-propyl phosphite, phenyl di-n-butyl phosphite, phenyl di-sec.-butyl phosphite, phenyl di-n-pentyl phosphite, phenyl dineopentyl phosphite, phenyl di-n-hexyl phosphite, p-methoxyphenyl di-n-butyl phosphite, m-chlorophenyl di-n-butyl phosphite, phenyl (n-propyl-n-pentyl) phosphite, phenyl (n-propyl-n-butyl) phosphite, phenyl (n-propyl-n-hexyl) phosphite, phenyl (n-butyl-n-pentyl) phosphite, phenyl (n-butyl-n-hexyl) phosphite, phenyl (n-pentyl-n-hexyl) phosphite, phenyl (neopentyl-n-propyl) phosphite, phenyl (neopentyl-n-butyl) phosphite, phenyl (neopentyl-n-hexyl) phosphite, cresyl di-n-pentyl phosphite, tert.-butylphenyl di-n-butyl phosphite, n-butylphenyl di-n-butyl phosphite, sec.-butylphenyl di-n-butyl phosphite, ethylphenyl di-n-butyl phosphite, xylyl di-n-butyl phosphite, di(tridecyl) phosphite, triethyl phosphite, tributyl phosphite, trioctyl phosphite, benzyl diethyl phosphite, tricyclohexyl phosphite, tris-p-cyanoethyl phosphite, triphenyl phosphite, tri - (3 - phenoxyphenyl) phosphite, tri - (3,5 - dimethylphenyl) phosphite, tri-(p-tert.-amylphenyl) phosphite and tris-(2-chloroethyl) phosphite.

The amount of the organic phosphite added to the heat transfer fluid is adjusted in terms of the particular system, the fluid composition, and the contemplated maximum operating temperature to which the fluid will be exposed. In general, an amount of phosphite equal to from about 0.001 to about 0.5% by weight if the base fluid can be employed, although an amount from about 0.01 to about 0.05% is generally preferred for systems operating at 600 to 700° F. Amounts of additives greater than 0.5% can be used, but no commensurate advantages are obtained thereby.

Since such variables as operating temperature, hot spot temperature at heat transfer surfaces, system design, and ratio of metal surface area to fluid volume all influence the thermal stability of the fluid, the optimum addition level is best determined individually for each system.

The inert gas purge is preferably applied to the heat transfer system wherever the fluid is in contact with a vapor phase and provisions can be made for venting the gas. Generally this is limited to the reservoir or surge tank since the remainder of the system is operated vapor-free. The inert gas should be sparged into the liquid for most effective use and most efficient removal of the gaseous decomposition products, notably HCl, from the liquid. The sparge may be combined with an inert gas sweep across the surface of the fluid if desired.

In a preferred embodiment of this invention, inert gas is sparged into the heat transfer fluid contained in the reservoir tank. A sparge rate of about 0.2 standard cubic feet of gas per hour per gallon of fluid being treated is generally adequate. The quantity of fluid being treated is that amount of fluid contained in the tank above the point of sparge. The optimum sparge rate may vary from about 0.05 to about 1.0 standard cubic feet per hour per gallon of fluid being treated, depending upon the operating conditions of the system, the volume of fluid contained in the system, and the volume of the reservoir tank. The optimum level of gas sparge is, therefore, best determined individually for each system.

The sparged gas may be any inert gas composition, with nitrogen, carbon dioxide, or mixture thereof being preferred for reasons of economy. Moist gas from an inert gas generator is considered satisfactory for this application.

The stabilizing effect of the combination of the organic phosphite and inert gas purge on the thermal decomposition of a heat transfer fluid is illustrated in the following examples. The metal corrosion data were obtained by standard oxidation and corrosion tests conducted in accordance with Federal Test Method Standards No. 791-Method 5308 except for certain variations in fluid volume, test temperature, gas composition, and metal material which are described in the following procedure.

A 100 gram sample of heat transfer fluid was placed in a sample tube which was approximately 25 inches long and 2 inches in diameter. One iron test coupon was immersed in the fluid and another was suspended in the vapor space above the fluid. The sample tube was placed in a constant temperature bath preheated to the desired test temperature. The inert gas purge, when included, was introduced through a tube inserted through the top of the sample tube and extending down into the sample to provide a gas sparge below the surface of the fluid.

As the test proceeded, samples were withdrawn at regular intervals for viscosity determination. All viscosities were determined in an Oswald Viscosimeter at 100° F. The change in viscosity with time was taken as the measure of the thermal decomposition rate. Samples withdrawn for viscosity determination were returned to the sample tubes after the measurement was completed.

The metal coupons were weighed and examined visually to determine the effect of the fluid and fluid vapors on the metal. In the following examples, a weight gain of less than about 0.1% was not considered significant. Larger increases in weight were due to the formation of solids either from the deposit of excess additive or from the corrosion of the iron. Weight loss was attributed to metal loss due to corrosion. In most cases, the appearance of the sample was the most significant measure of the effectiveness of the system in preventing metal attack.

Example 1

A heat transfer fluid consisting of chlorinated biphenyl containing 48% chlorine was evaluated in a series of tests involving different diisopropyl phosphite additive levels and nitrogen purge rates. Table I below summarizes the fluid compositions and the results of the evaluation in terms of viscosity increase, iron attack, formation of sludge, and appearance of the iron coupon and the fluid after test. The test was conducted at 650° F. for a period of 168 hours.

TABLE I

| | Additive, wt. percent | N₂ sparge, l./hr. | Percent viscosity increase | Fe [1] attack | Appearance Fe coupon | Fluid |
|---|---|---|---|---|---|---|
| Experiment: | | | | | | |
| 1 | 0.01 | 1.0 | 6.2 | 0.06 | Iridescent | Gold. |
| 2 | 0.01 | 4.0 | 5.7 | .04 | ___do___ | Do. |
| 3 | 0.02 | 1.0 | 8.2 | .10 | ___do___ | Do. |
| 4 | 0.02 | 4.0 | 9.2 | .07 | ___do___ | Do. |
| 5 | 0.04 | 1.0 | 6.3 | .18 | ___do___ | Do. |
| 6 | 0.04 | 4.0 | 6.3 | .11 | ___do___ | Do. |
| Controls: | | | | | | |
| 7 | None | None | 94.5 | .95 | Rusty | Black. |
| 8 | .04 | None | 53.3 | .16 | Iridescent | Solids. |
| 9 | None | 1.0 | 6.8 | 0.20 | Brown-black | Black. |

[1] Weight gain in mg. per sq. cm. of iron surface.

It is apparent from the above data that there is no significant difference in the results obtained between the upper and lower levels of additive concentrations and nitrogen purge rates used in this example. It is also seen that the inert purge alone significantly stabilizes the fluid against viscosity increase, but fails to prevent rusting of the iron coupon and discoloration of the fluid. Similarly, the use of the additive without the inert gas purge essentially prevents iron attack, but fails to prevent a change in fluid viscosity. Only by using the combination of the additive and the inert gas purge can the system be stabilized against both viscosity increase and iron attack.

Example 2

Experiment 3 of Example 1 was repeated substituting carbon dioxide for the nitrogen inert gas purge. Similar results were obtained, with a viscosity increase of 4.8% and an iron attack value of 0.09 mg. per square cm. of iron surface. The test demonstrates that carbon dioxide may be substituted for nitrogen as the purge material without effect on the heat transfer system.

Example 3

The heat transfer fluid and diisopropyl phosphite additive of Example 1 were evaluated in a long-term test for 1000 hours at 650° F. Iron coupons were subjected to the action of the liquid and the vapor during this test period. At the conclusion of the test period, the coupons were weighed to determine weight loss or gain, and inspected for appearance and the presence of any coatings or deposits. The percent viscosity increase of the fluid was also determined as a measure of the extent of thermal decomposition occurring during the extended test period. The test data obtained are presented in Table II below.

TABLE II
1000 hrs. at 650°F.

| Exp. | Additive, wt. percent | $N_2$ purge, l./hr. | Percent viscosity increase | Iron attack In liquid | Iron attack In vapor | Appearance iron coupons |
|---|---|---|---|---|---|---|
| 1 | 0.02 | 0.25 | 100 | +0.11 | +0.13 | Iridescent. |
| 2 | 0 | 0.25 | 100 | +1.46 | +1.47 | Copper coating. |
| 3 | 0.02 | 0 | a 1,500 | +0.04 | +0.12 | Iridescent. |
| 4 | 0 | 0 | b 1,000 | +0.92 | −0.41 | Rusty. | a After 600 hours.
b After 400 hours.

The data from the 1000 hour test confirmed the results obtained in Example 1. Specifically, it is evident that both the additive and the purge are required to stabilize the fluid against viscosity increase, and to reduce the amount of iron attack in the formation of coatings on the iron samples. It is evident from Experiment 2 that a small nitrogen purge, while stabilizing the viscosity of the fluid, does not afford any protection to the iron exposed to the liquid or the vapor. From Experiment 3, it is seen that while the additive reduces the corrosivity of the fluid, it contributes very little to viscosity stabilization.

Experiments 1 and 2 were continued beyond the 1000 hour test period to study the change in fluid viscosity and determine maximum fluid life. Viscosity data for these two samples are presented in Table III below.

TABLE III
Percent Viscosity Increase at 650° F.

| | Time, hrs. | | | | | | | | | |
|---|---|---|---|---|---|---|---|---|---|---|
| | 600 | 1,000 | 1,500 | 2,000 | 2,500 | 3,000 | 4,000 | 4,500 | 5,000 | 5,500 |
| Experiment 1 | 12 | 18 | 27 | 36 | 80 | 146 | 344 | 460 | 670 | 1,400 |
| Experiment 2 | 30 | 54 | 125 | 275 | 1,608 | | | | | |
| Experiment 3 | 1,500 | | | | | | | | | |

The data in Table III above clearly illustrate the fluid stability in three possible heat transfer systems operating for extended periods of time at 650° F. Exp. 1 is typical of the systems of this invention which include both the nitrogen purge and the phosphite additive. Exp. 2 was run under identical conditions but with the nitrogen purge only, and Exp. 3 was run with the additive only.

Heretofore, test data up to 1000 hours exposure time indicated that the nitrogen purge was primarily responsible for preventing fluid viscosity increase, and that the addition of the phosphite additive had little absolute effect in this regard. It was indeed surprising therefore, that when Exp. 2 was terminated after 2500 hours with a viscosity increase of about 1600 percent, the fluid viscosity in Exp. 1 had increased only 80 percent.

It is apparent from the data in Table III that the difference between Exp. 1 and Exp. 2 is far greater than could reasonably be attributed to a simple additive effect of the phosphite and the nitrogen purge. Exp. 3 with phosphite alone terminated after 600 hours, while Exp. 2 with nitrogen alone terminated atfer 2500 hours. Thus it is seen that the combination of the phosphite and nitrogen provides more than twice the operating life of nitrogen alone, and nearly 10 times that of the phosphite alone. Clearly there is an interaction or synergistic effect between the organic phosphite additive and the inert gas sweep which is not evident until after 100 hours of operation at temperatures in excess of 600° F., and which effect has heretofore been unknown.

Example 4

In a commercial size heat transfer system, a surge tank approximately 10 feet high and 4 feet in diameter and normally containing from about 150 to 200 gal. of heat transfer fluid was equipped with an inert gas sparge consisting of a pipe formed into a circular ring and having 1/16 inch diameter holes drilled on 1 inch centers around the circumference of the ring. The ring was positioned below the normal minimum liquid level in the tank. During operation of the system, fluid was circulated through the tank at a rate of from about 60 to 300 gal. per min., and inert gas was sparged into the fluid at a rate of about 0.2 cu. ft. per hr. per gal. of fluid contained in the tank above the point of sparge. Sparged gas was vented from the top of the tank. The inert gas sparge rate of about 0.2 cu. ft. per hr. per gal. of fluid being treated was found to be a near optimum level for this system. In general, a sparge rate of at least 0.5 and preferably from about 0.1 to about 0.5 cu. ft. per hr. per gal. of fluid under treatment is used. At lower rates, the volume flow of gas may be insufficient to sweep the gaseous decomposition products from the system, while higher rates provide no additional benefit and are economically unjustified.

The preceding examples serve to illustrate the practice of the present invention, but the invention is not intended to be limited thereto. For example, given the knowledge of this invention, it is within the ability of one skilled in the art to modify the described procedure without departing from the spirit or scope of the present invention. For example, the concentration of the stabilizing additive or the rate of the inert gas flow may be varied, or the inert gas may be simultaneously sparged into and swept across the liquid heat transfer fluid. Heat transfer systems having multiple reservoirs or other vapor spaces may employ various combinations of inert gas sparges and sweeps. Furthermore, it is contemplated that the method of the present invention may be combined with the continuous purge and recovery systems of the prior art. All such variations in equipment and procedure are contemplated to be within the scope of the present invention.

The embodiments of this invention in which an exclusive property or privilege is claimed are defined as follows:

1. In a heat transfer system utilizing halogenated biphenyl, halogenated terphenyl, halogenated quaterphenyl, or mixtures thereof as a heat transfer fluid between a heat source and a heat sink, the improvement comprising:
(A) incorporating in the heat transfer fluid from about 0.001 to 0.5 percent by weight of the fluid of an organic phosphite stabilizer represented by the formula

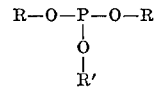

wherein each R and R' is individually selected from the group consisting of alkyl radicals having from 1 to about 10 carbon atoms and aryl radicals having from about 6 to 16 carobn atoms, and provided that R' can in addition be hydrogen, and, (B) sparging an inert gas into the heat transfer fluid at a rate from about 0.05 to about 1.0 standard cubic feet per hour per gallon of heat transfer fluid and purging from the system the inert gas together with gaseous thermal decomposition products.

2. A heat transfer system of claim 1 wherein the aryl radicals are selected from the group consisting of alkyl, aryl, alkoxy, and aryloxy substituted aryls.

3. A heat transfer system of claim 1 wherein the heat transfer fluid is a chlorinated biphenyl.

4. The system of claim 1 wherein the organic phosphite stabilizer is diisopropyl phosphite.

5. A heat transfer system of claim 1 wherein the inert gas is selected from the group consisting of nitrogen, carbon dioxide, and mixtures thereof.

6. In a heat transfer system utilizing a halogenated biphenyl, halogenated terphenyl, halogenated quaterphenyl, or mixtures thereof as a heat transfer fluid between a heat source and a heat sink and including a fluid reservoir tank having a vapor space above a quantity of fluid, the improvement comprising:

(A) incorporating in the heat transfer fluid from about 0.01 to about 0.05% by weight of an organic phosphite compound represented by the formula

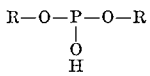

wherein each R is individually selected from the group consisting of alkyl radicals having from 1 to about 10 carbon atoms and (B) sparging into the fluid contained in the reservoir tank a substantially continuous stream of inert gas at an average rate of from about 0.05 to about 1.0 standard cubic feet per hour per gallon of fluid contained in the tank above the point of sparge and purging from the system the inert gas together with gaseous thermal decomposition products.

7. A method for stabilizing the viscosity of halogenated polyphenyl heat transfer fluids selected from the group consisting of halogenated biphenyl, halogenated terphenyl, halogenated quaterphenyl and mixtures thereof which comprises sparging a stream of inert gas into the fluid at an average rate of from about 0.05 to 1.0 standard cubic feet per hour per gallon of heat transfer fluid and purging from the system the inert gas together with gaseous thermal decomposition products.

8. A method of claim 7 wherein the halogenated biphenyl is chlorinated biphenyl having from about 30% to 60% by weight chlorine.

9. A method of claim 7 wherein the inert gas is selected from the group consisting of nitrogen, carbon dioxide and mixtures thereof.

References Cited

UNITED STATES PATENTS

| | | | |
|---|---|---|---|
| 2,136,774 | 11/1938 | Hickman | 55—53 |
| 2,741,598 | 4/1956 | Good | 252—78 |
| 3,115,465 | 12/1963 | Orloff et al. | 252—78 X |
| 3,150,516 | 9/1964 | Linnenbom et al. | 55—53 X |
| 3,280,031 | 10/1966 | Brennan et al. | 252—49.8 |
| 3,496,107 | 2/1970 | Lima et al. | 252—49.9 |

LEON D. ROSDOL, Primary Examiner

D. SILVERSTEIN, Assistant Examiner